United States Patent [19]
McGookin

[11] Patent Number: 6,003,366
[45] Date of Patent: Dec. 21, 1999

[54] LIQUID LEVEL INDICATING METHOD AND SYSTEM

[76] Inventor: Hugh R. McGookin, 79440 Granada Dr., Bermuda Dunes, Calif. 92201

[21] Appl. No.: 08/987,532

[22] Filed: Dec. 9, 1997

[51] Int. Cl.⁶ .................................................. G01F 23/20
[52] U.S. Cl. .............................................. 73/296; 73/309
[58] Field of Search ...................... 73/296, 309; 177/50

[56] References Cited

U.S. PATENT DOCUMENTS

| | | |
|---|---|---|
| 706,505 | 8/1902 | Washington . |
| 2,029,405 | 2/1936 | Beadle ................................... 73/309 |
| 2,096,411 | 10/1937 | St. John et al. . |
| 2,791,907 | 5/1957 | Griner et al. ........................... 73/309 |
| 4,096,024 | 6/1978 | Dusserre et al. ...................... 156/601 |
| 4,188,726 | 2/1980 | Wemyss ............................... 73/309 X |
| 4,276,774 | 7/1981 | McGookin ............................. 73/290 |
| 4,368,640 | 1/1983 | Tokarz .................................. 73/311 |
| 4,843,876 | 7/1989 | Holm ..................................... 73/309 |
| 4,945,756 | 8/1990 | Lewis et al. ........................... 73/49.2 |
| 5,132,923 | 7/1992 | Crawford et al. .................. 73/309 X |
| 5,157,968 | 10/1992 | Zfira ...................................... 73/149 |

FOREIGN PATENT DOCUMENTS

| | | | |
|---|---|---|---|
| 0016417 | 1/1990 | Japan . | |
| 156775 | 10/1956 | Sweden .............................. 73/309 |
| 438881 | 5/1978 | U.S.S.R. ............................. 73/296 |
| 628407 | 10/1978 | U.S.S.R. ............................. 73/296 |

OTHER PUBLICATIONS

Bob Zorich; *Monitoring Liquid Chemical Levels, Semiconductor International*; Jul. 1997; pp. 327, 328, 330, 332, 334.

Primary Examiner—Hezron Williams
Assistant Examiner—Willie Morris Worth
Attorney, Agent, or Firm—Christie, Parker & Hale, LLP

[57] ABSTRACT

A liquid level indicating system includes a plastic link chain suspended in a container extending between a high level position and a low level position of a liquid in the container. A weighing device is positioned above the high level position of the liquid for measuring the weight of the chain. An attachment device secures a lower portion of the chain to the bottom of the container with sufficient slack so as not to affect the operation of the weighing device.

28 Claims, 7 Drawing Sheets

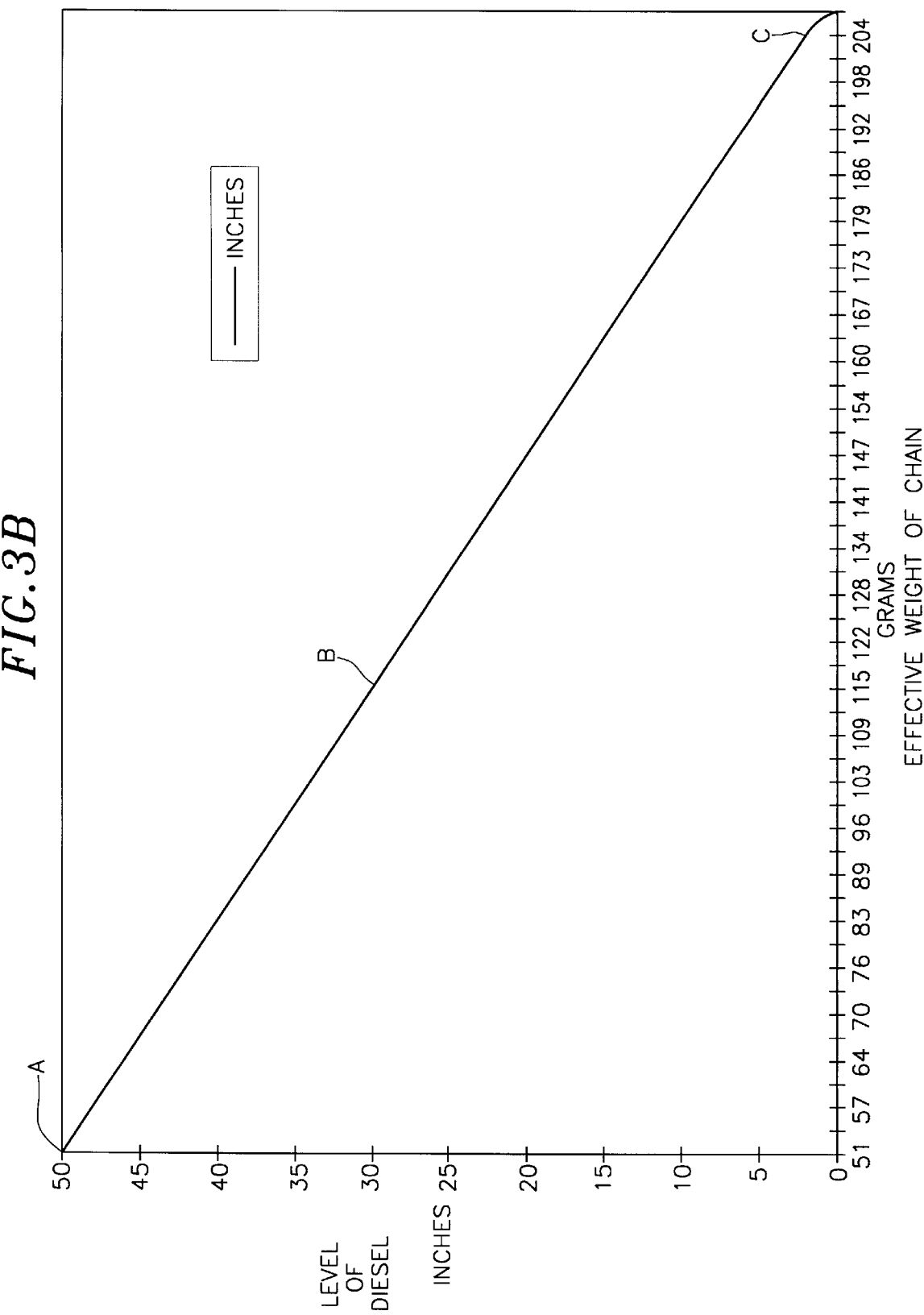

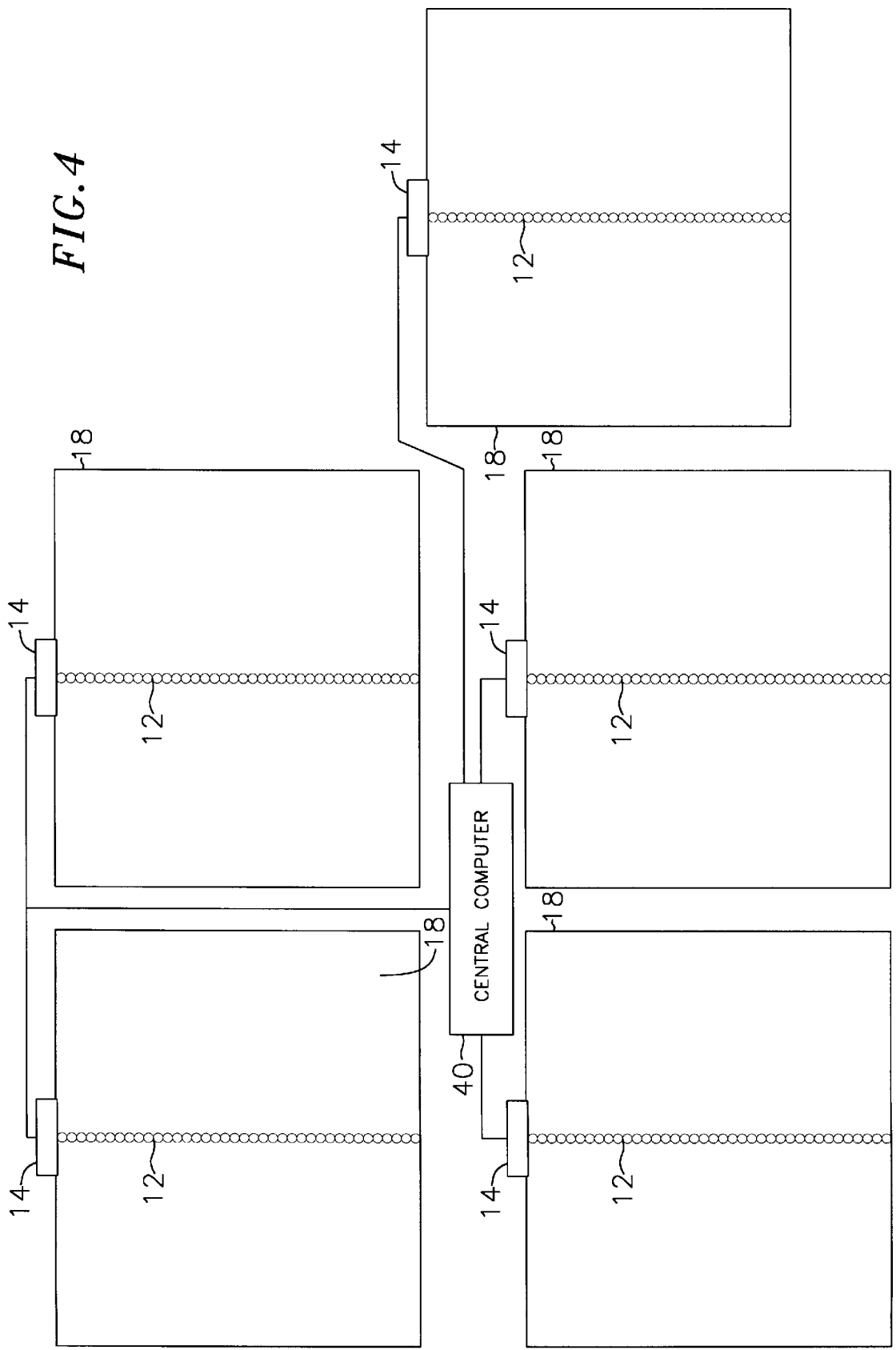

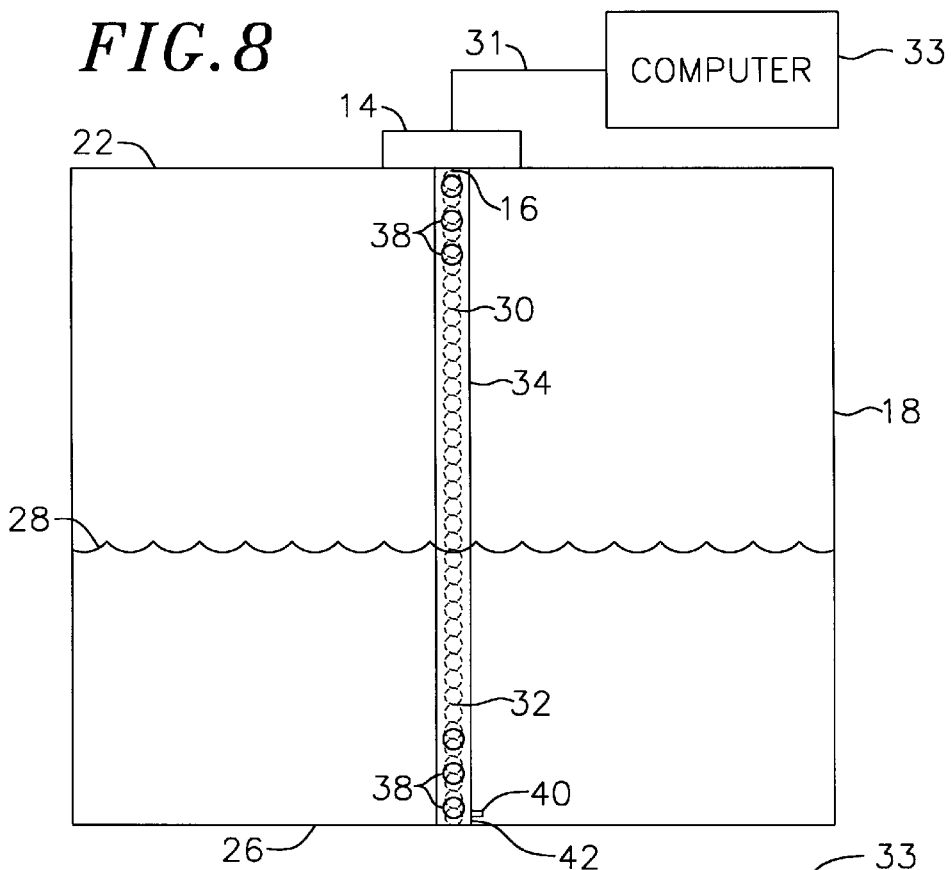
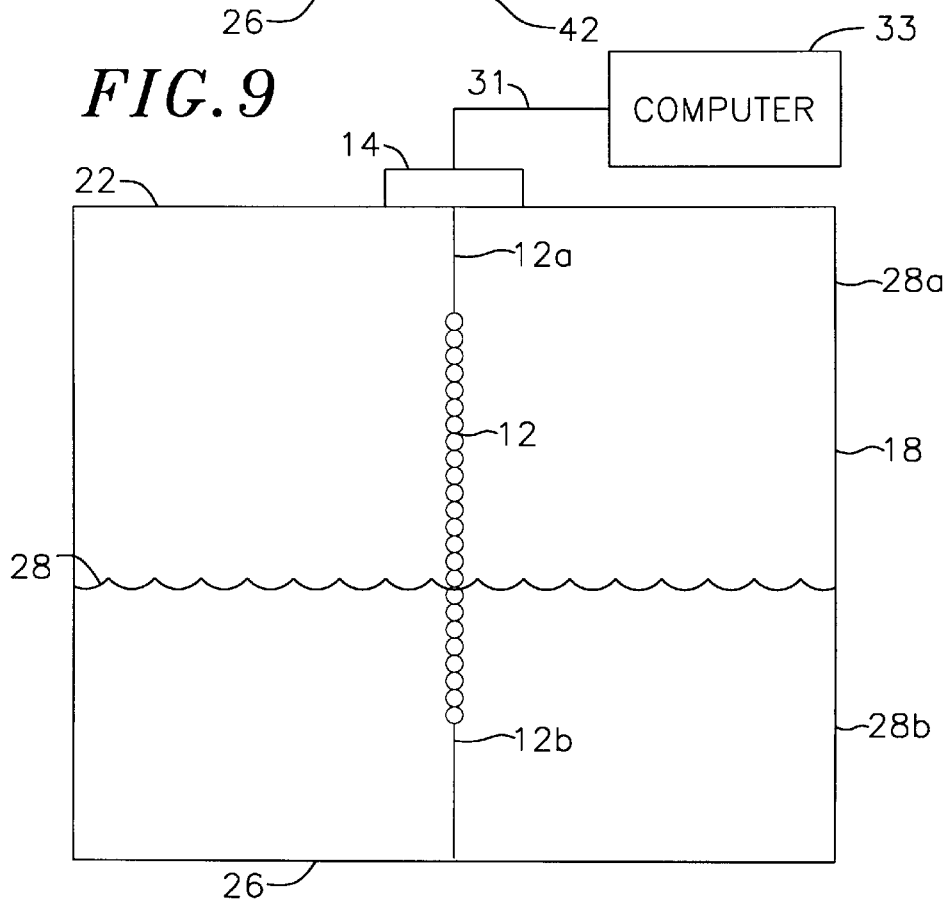

LIQUID LEVEL INDICATING METHOD AND SYSTEM

FIELD OF THE INVENTION

The present invention relates to a method and apparatus for measuring the level of liquid in a tank or container, and more particularly to a simple, easy to use liquid level indicating method and system for measuring the level of a liquid in a container (or a river, stream, aqueduct, etc.), by first determining how empty, rather than how full, the container is at any moment.

BACKGROUND OF THE INVENTION

Methods and systems are known for making various measurements of liquids within containers, including those that measure or indicate liquid level or volume by the use of a float, and those that weigh the liquid together with its container of known weight. However, the known systems are usually relatively complicated or are limited as to the types of applications in which they may be conveniently and accurately used. For example, the accuracy provided by a liquid measuring system that weighs the liquid together with its container is inherently limited by the additional component of the container's weight in the initial output of the system. An exemplary embodiment of a prior art float system is disclosed in U.S. Pat. No. 2,096,411 to St. John et al. Float systems generally require the use of guide wires within the container to position the float, and often require a significant amount of maintenance to keep the measuring system operational. Moreover, liquid measuring systems that use floats may not be well-suited for applications involving pressure vessels due to the affect of the pressure on the floats.

Consequently, as a result of these and other disadvantages in the prior art systems, a need exists for improved liquid level indicating methods and systems.

SUMMARY OF THE INVENTION

The present invention, therefore, provides an improved liquid level indicating method for measuring the level of a liquid in a container. A chain, capable of extending at least to the lowest level of the liquid to be measured, is suspended to the liquid, the chain preferably being of substantially uniform density from the high to the low level positions of the liquid. Substantially only the portion of the chain above the level of the liquid is weighed, providing an indication of the liquid level in the container.

In one embodiment, the liquid level indicating system includes a weighing device positioned above the high level position of the liquid. A chain is suspended to the liquid from the weighing device. Substantially only the weight of the portion of the chain above the level of the liquid is measured. The weight of the portion of the chain above the level of the liquid is a direct indication of how empty the container is at any moment. For a tank of a given height, this is also an indication of the level of the liquid in the container at any given moment. Preferably, the chain provides a substantially linear change in weight sensed by the weighing device with changes in the level of the liquid in the container.

The ratio of the density of the liquid to the density of the chain is preferably at least 1:1, so that substantially only the portion of the chain above the liquid is weighed, as would occur when the chain is buoyant and floats in or on the liquid.

For systems where the ratio of the density of the liquid to the ratio of the density of the chain is less than 1:1, a calibrator is provided so that the output of the weighing device may be adjusted accordingly to provide an indication of the level of the liquid in the tank. Additionally, the weighing device may be connected to a computer or other device for receiving the output of the weighing device and computing the level of the liquid in the container directly from the effective weight of the chain.

Preferably, the lower portion or end of the chain is retained from upward movement relative to the container due to the buoyant force of the liquid. This may be done by connecting the lower end of the chain to the bottom of the container by a linking element or a magnet. A stilling well or other means may be provided around the chain to minimize side movement of the chain due to movement of the liquid in the container.

BRIEF DESCRIPTION OF THE DRAWINGS

These and other features and advantages of the present invention will be appreciated as the same become better understood by reference to the following Detailed Description when considered in connection with the accompanying drawings, wherein:

FIG. 3B is a graph of the output of the level of diesel in a container versus the effective weight of the chain sensed by the weighing device in an exemplary embodiment of the present invention;

FIG. 4 is a schematic view of a plurality of containers having a liquid level indicating system connected to a central computer;

FIG. 8 is a cross-sectional view of the container of FIG. 5, wherein a stilling well is utilized around the chain; and FIG. 9 is a cross-sectional view of the container of FIG. 1, wherein wires are used to connect the chain to the top and bottom of the container.

DETAILED DESCRIPTION OF THE INVENTION

Figure 1:
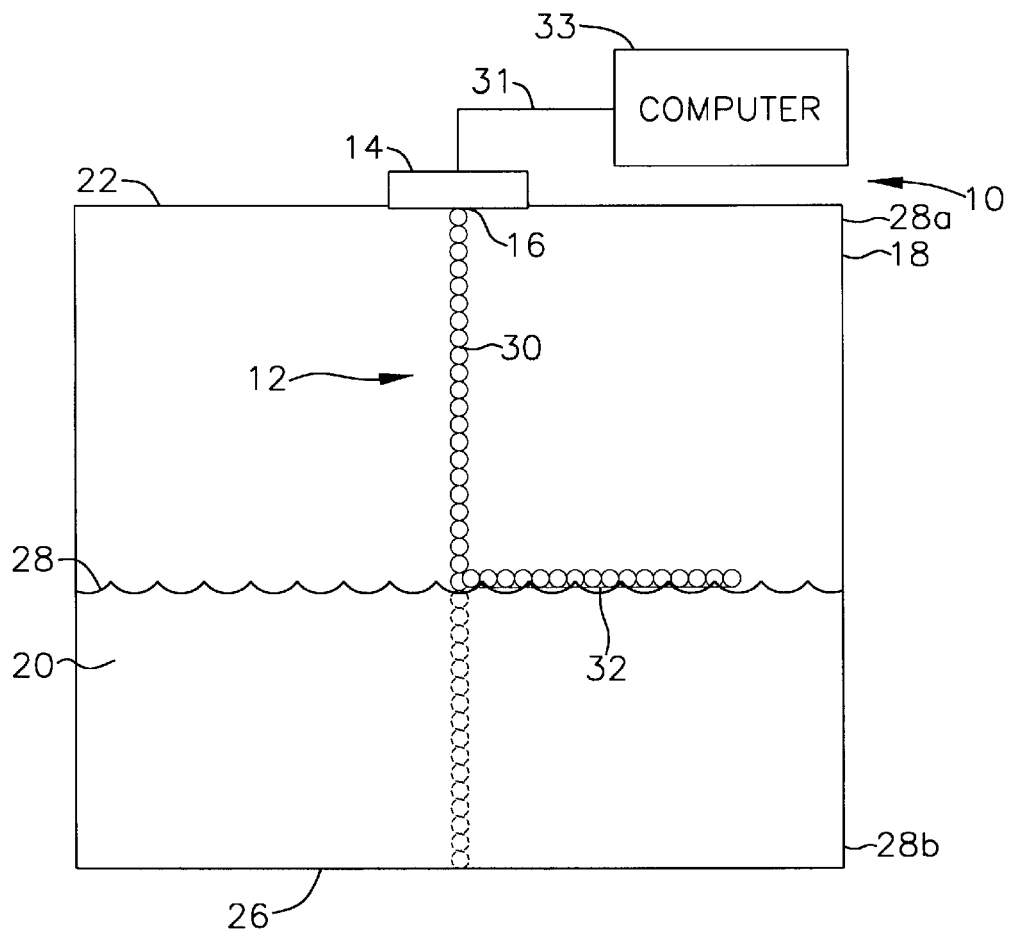
FIG. 1 is a cross-sectional view of a container that is partially filled having a liquid level indicating system and embodying the present invention.

Referring now to FIG. 1, a liquid level indicating system according to the present invention is illustrated for a partially filled container. The liquid level indicating system 10 is capable of measuring the level of a liquid 28 in the container over a range of levels of the liquid, from a high level position 28a of the liquid, to a low level position 28b of the liquid. Typically, the high level position of the liquid will be near a top 22 of the container, and the low level position of the liquid will be near a bottom 26 of the container.

A container 18 is capable of holding a liquid 20 to be measured. A chain 12 is connected to a weighing device 14, such as a load cell or other force transducer. The chain is attached to the weighing device at an upper portion, preferably at end 16, of the chain and is suspended substantially vertically within the container. The chain 12 is sufficiently long such that it can extend from the high level position 28a to the low level position 28b of the liquid.

Figure 1A:
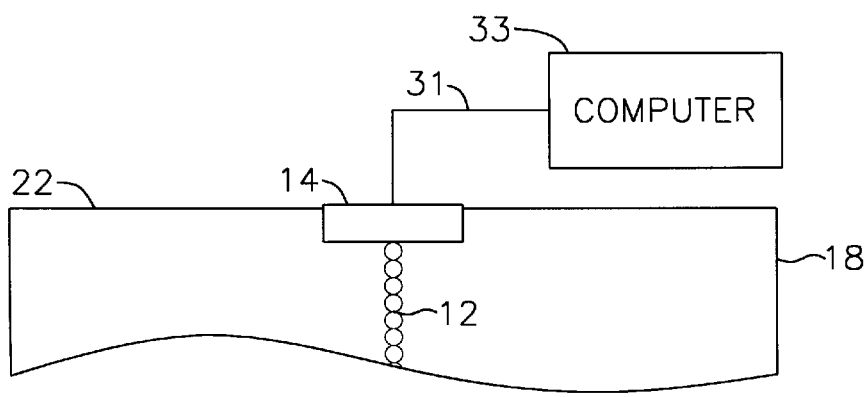
FIG. 1A is a partial cross-sectional view of the container in FIG. 1 housing the liquid level indicating system within the container.

The weighing device 14 is located above the high level position of the liquid 28a, preferably adjacent the top 22 of the container. The weighing device may be attached to the outside of container 18, as shown in FIG. 1, by any means well known in the art. For specific applications such as with volatile liquids or other dangerous liquids with which the liquid level measuring apparatus is used, it may be necessary to use a weighing device encased in a special housing, such as an explosion-proof housing, when the weighing device is placed inside the container, as shown in FIG. 1A. However, as housings of this type are well-known in the art, they will not be discussed in detail in connection with the present invention.

Chains that provide a ratio of the density of the liquid to the density of the chain of less than 1:1 may be used, provided that they allow for a sufficiently large change in weight that may be sensed by the weighing device due to changes in liquid level in the container. With a very low density ratio, the weight of the chain may be quite high and it may be expensive or difficult to obtain a sufficiently accurate weighing device to weigh the difference in weight of the chain as the liquid changes level.

In a presently preferred embodiment of the system, the specific gravity of the chain is less than the specific gravity of the liquid to be measured. In other words, the ratio of the density of the liquid to the density of the chain is at least 1:1, and preferably greater. Such a chain will be a relatively light weight chain and hence changes in weight will be easier to measure with a sensitive weighing device. Under these conditions, substantially only the weight of that portion of the chain above the liquid is measured by the weighing device. In this regard, the buoyant force acting upward on the chain as a result of the liquid in the container will be sufficient to cause the chain to float substantially at or near the surface 28 of the liquid, as can be seen in FIG. 1. The chain is preferably of substantially uniform density between the high level position 28a and the low level position 28b of the liquid, and is preferably of substantially uniform density over its entire length, such that the weight of the chain that is measured is directly related to its length. In a presently preferred embodiment, the chain is made of high density polyvinyl chloride (PVC) plastic, having a specific gravity of about 0.92, and therefore capable of floating in water. Plastic chains having these characteristics is available from Peerless Chain of Winona, Minn. The specific characteristics of the chain (length, density, link size) may be selected as required by the particular application of the liquid level indicating system. As a result of these preferred characteristics of the chain 12, the effective weight of the chain sensed by the weighing device is substantially only the weight of the portion of the chain above the level of the liquid 30.

More specifically, the weighing device senses the total weight of the chain above the bottom of the container, less the buoyant force acting on the portion of the chain in the liquid. When the specific gravity of the chain is less than the specific gravity of liquid in the container, the buoyant force of the liquid acting upward on the chain negates the weight of the portion of the chain below the surface of the liquid 32. Therefore, the effective weight of the chain sensed by the weighing device is only the weight of the portion of the chain above the level of the liquid. Since the density of the chain is substantially uniform, the weight of the portion of the chain above the level of the liquid is directly related to the length of the portion of the chain above the level of the liquid 30. The length of the portion of the chain above the level of the liquid is an indication of how empty the container is at any moment. Knowing the distance between the high and low level positions of the chain and the length of the chain, the level of the liquid in the container may be obtained from the length, and therefore the weight, of the portion of the chain above the level of the liquid 30.

Figure 2:
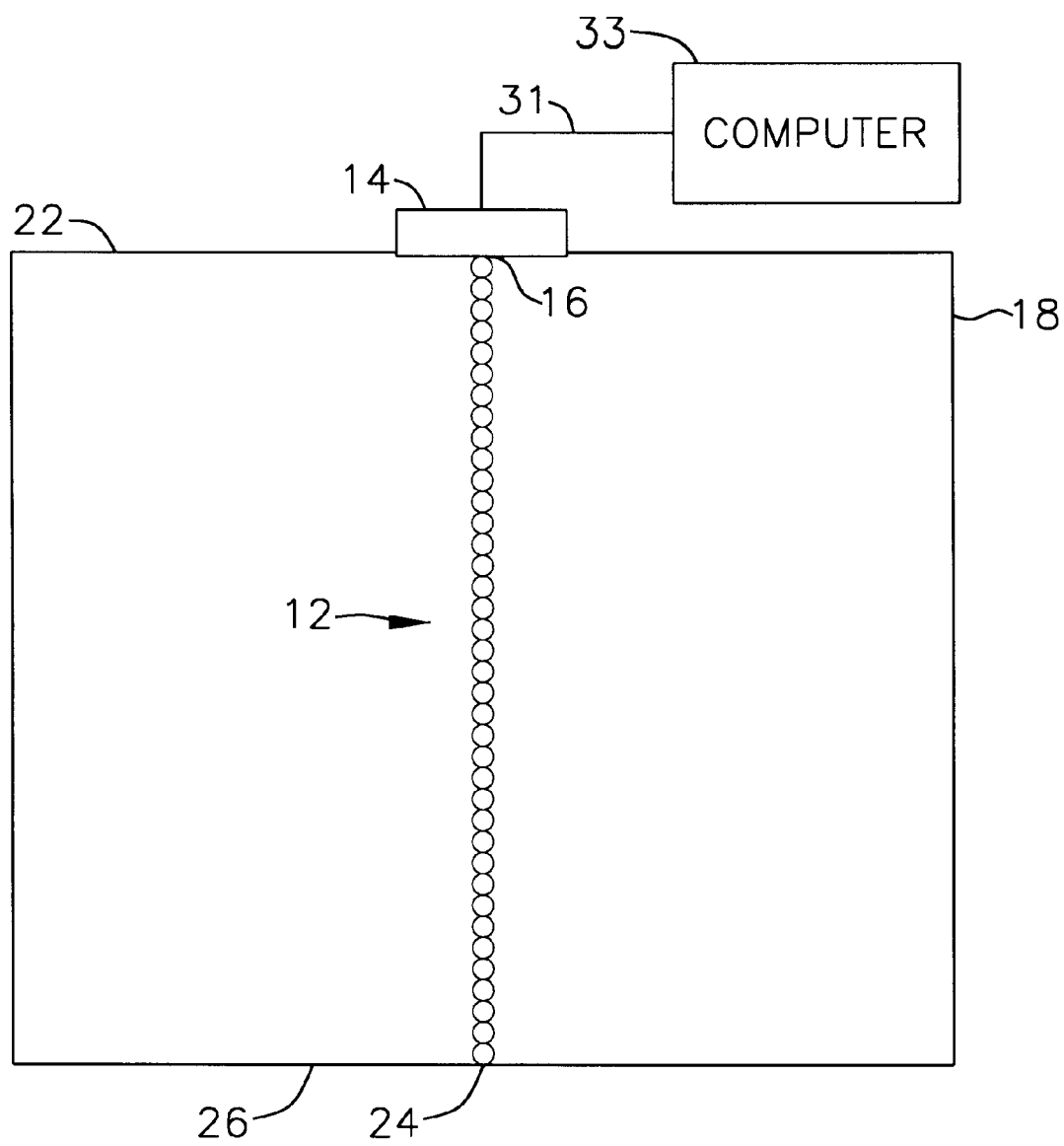
FIG. 2 is a cross-sectional view of the container of FIG. 1, wherein the container is empty.

Therefore, a change in the output of the weighing device indicates a change in the liquid level in the container. More specifically, changes in the effective weight sensed by the weighing device will reflect changes in the total buoyant force acting on the chain as a result of the liquid, which in turn may be directly related to the liquid level within the container. When the container is empty (FIG. 2), the effective weight of the chain sensed by the weighing device will be that of the entire chain, if the a lower end of the chain is immediately adjacent the bottom surface of the container when the container is empty, as in the embodiment illustrated in FIG. 2. More particularly, the effective weight of the chain sensed by the weighing device when the container is empty will be that of the portion of the chain that extends to the bottom of the container, as any excess length of chain would be supported by the bottom of the tank.

The effective weight of the chain sensed by the weighing device will decrease linearly as the liquid level in the container increases, until the effective weight of the chain sensed by the weighing device is essentially zero when the container is completely full. At this point, the entire length of the chain would be substantially negated by the buoyant force of the liquid.

Figure 3A:
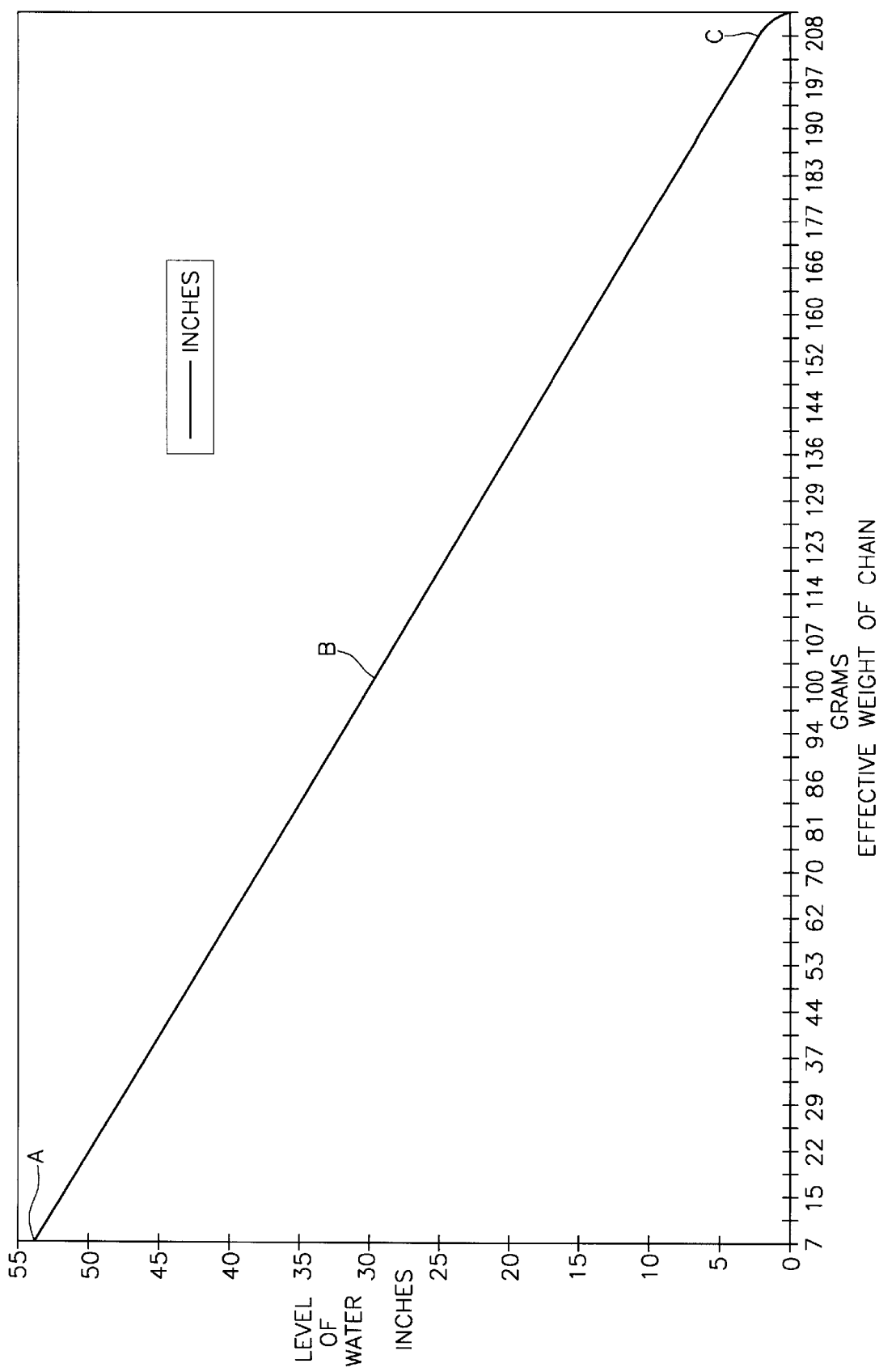
FIG. 3A is a graph of the level of water in a container versus the effective weight of the chain sensed by the weighing device in an exemplary embodiment of the present invention.

Referring first to FIG. 3A, a graph of the output of a prototype of the system is illustrated, indicating the level of water in a container versus the effective weight of the chain sensed by the weighing device. As can be seen from the downward slope of FIG. 3A, the effective weight of the chain sensed by weighing device increases as the level of water in the container decreases. For example, with the level of the water near its high level position (Point A), about 54 inches of water, the effective weight of the chain is substantially zero. As the level of water in the container decreases to about 30 inches (Point B), the effective weight of the chain sensed by the weighing device increases to about 100 grams. Once substantially all of the water in the container is removed (Point C), the effective weight of the chain sensed by the weighing device is about 210 grams.

In the example illustrated in FIG. 3A, the density ratio of the liquid to the chain was at least 1:1, and thus there is no need to calibrate the system. Where the density ratio is less than 1:1, it may be necessary to calibrate the system for the weight of the portion of the chain below the surface of the liquid. The effective weight of the chain sensed by the weighing device depends on the buoyant force of the liquid, and thus on the specific gravity of the liquid. Therefore, where the ratio of the density of the liquid to the density of the chain is less than 1:1, the system preferably includes a means for calibrating the system based on the specific gravity of the liquid to be measured.

The means for calibrating the system may be a chart containing the necessary data, or may be automatically computed by a computer and applied to the output of the weighing device.

Referring now to FIG. 3B, a graph of the output of a prototype of the system is illustrated, indicating the level of diesel in a container versus the effective weight of the chain sensed by the weighing device. The same chain used in the example illustrated in FIG. 3A was used in the example illustrated in FIG. 3B. However, due to the lower density of diesel compared to water, the ratio of the density of the liquid (diesel) to the density of the chain is less than 1:1. The chart in FIG. 3B illustrates a way to calibrate for this effect. When the level of the diesel in the container is near its high level position (Point A), about 50 inches of diesel, the effective weight of the chain is about 50 grams due to the length of any chain above the high level position and the weight of the chain in the liquid. As the level of diesel in the container decreases to about 30 inches (Point B), the effective weight of the chain sensed by the weighing device increases to about 115 grams. Once substantially all of the diesel in the container is removed (Point C), the effective weight of the chain sensed by the weighing device is again about 210 grams.

Preferably, the weighing device 14 is directly connected by conventional circuitry 31 to a computer 33 or other device capable of processing and displaying the output of the weighing device as shown in FIGS. 3A and 3B. The output of the weighing device corresponds to the level of the liquid in the container, as discussed above. For a container of a given cross-sectional area, the output of the weighing device is converted into the volume of the liquid in the container by multiplying the level of the liquid by the cross-sectional area of the container. Likewise, for a given liquid in such a container, the output of the weighing device is converted into the weight or total gallons of the liquid in the container, by multiplying the volume of the container by the density of the liquid. Therefore, the computer is programmed to, among other things, provide instantaneous readings of the total number of gallons of liquid in the container. The computer may also be programmed with alarm points to indicate when the liquid in the container falls below a predetermined level. The computer may further be programmed to allow a user to input the specific gravity of the liquid to be measured so that the system may be calibrated for different liquids.

FIG. 4 shows a central computer 40 to monitor the liquid level in a series of containers, each having a liquid level indicating system such as in FIG. 1. The output from the weighing devices at each container may be routed to the central computer 40 for calibration and determining the level of liquid in each container.

The weighing device 14 may take different forms in which the weight of the chain is converted into electrical signals capable of further processing. In a prototype of the present invention, the weighing device is a Chatillon load cell Model DFGS-R. Load cells having the necessary characteristics are also available from Revere Transducers of Tustin, Calif. It should be noted that the particular characteristics of the load cell will depend on the application in which the system is being used.

Figure 5:
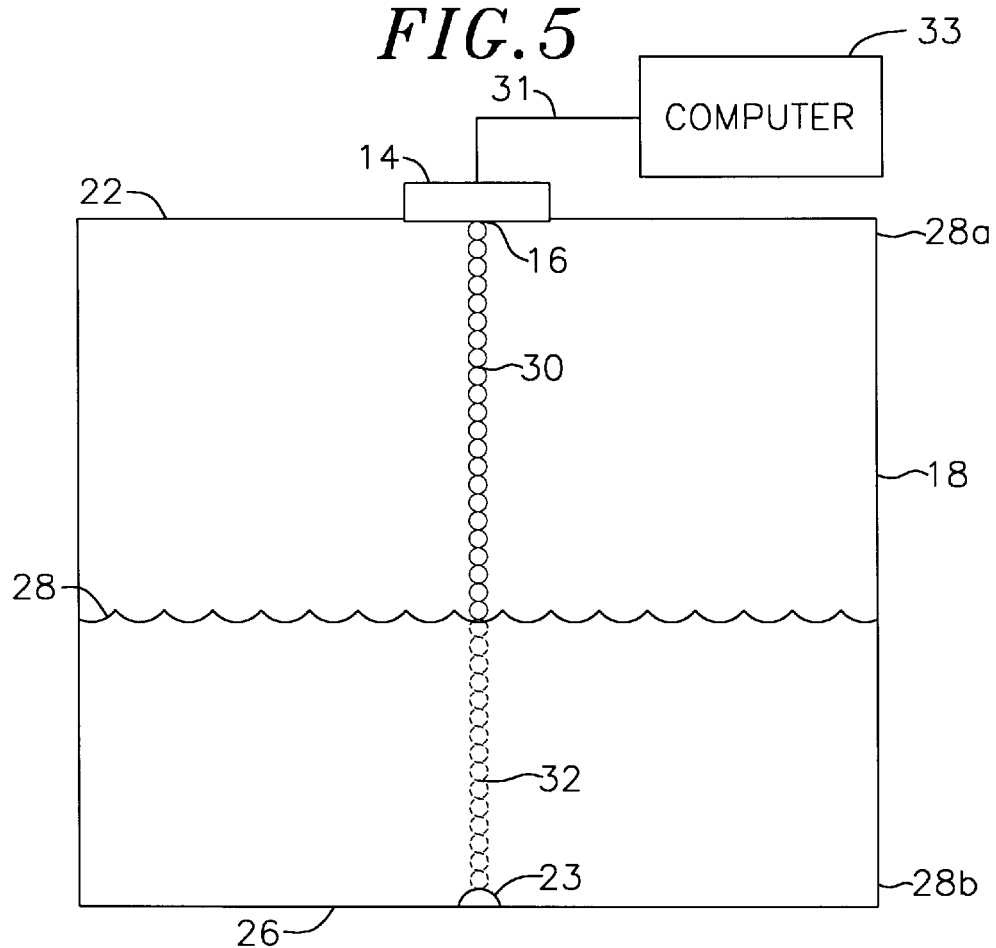
FIG. 5 is a partial cross-sectional view of the container of FIG. 1, wherein a lower portion of the chain is secured to the bottom of the container by a link.

Referring now to FIG. 5, an alternate embodiment of the liquid level indicating system is illustrated. The lower end of the chain is connected by a link 23 to the bottom of the container so that it is retained from floating upward relative to the bottom of the container. Securing the chain to the bottom of the container may be necessary in some applications where side movement of the chain is to be minimized, or the chain is to be kept from interfering with other objects or materials in the container, such as in aircraft or marine applications to keep the chain in position in the event of turbulence, or rolling or looping of the craft.

Figure 6:
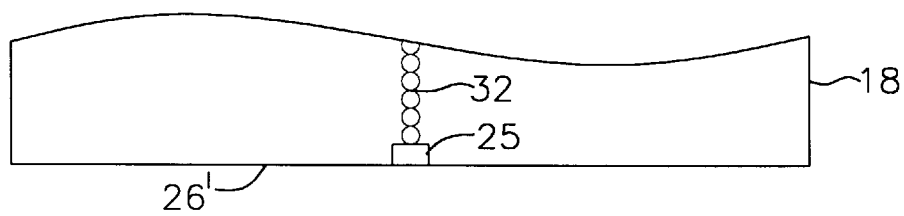
FIG. 6 is a partial cross-sectional view of the container is FIG. 5, showing a lower portion of the chain secured to a metal bottom of the container by a magnet.
Figure 7:
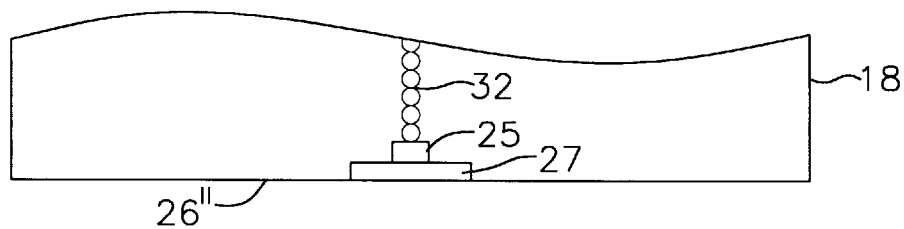
FIG. 7 is a partial cross-sectional view of the container is FIG. 5 showing a lower portion of the chain secured to a plastic bottom of the container by a magnet and a metal part affixed to the bottom of the container.

Retaining the lower end of the chain to the bottom of the container prevents the chain from floating to the surface, while not affecting the overall operation of the liquid level indicating system by introducing some slack in the chain. The chain may also be secured to the bottom of the container by any other means well known in the art, such as by a magnet 25 attached to the lower end of the chain 16 and attracted to a metal bottom 26' of container 18, as illustrated in FIG. 6. Alternatively, the magnet 25 may be attached to the chain and attracted to a metal part 27 that is affixed to a plastic bottom 26" of container 18, as illustrated in FIG. 7.

The liquid level indicating system of FIG. 8 includes a stilling well 34 through which the chain extends to the bottom of the container, to help stabilize the chain with movement of the liquid. The stilling well 34 comprises a tube 36, having a plurality of perforations 38 along its height to assure free liquid communication between the interior of the stilling well where the chain is located, and the rest of the container. The tube 36 illustrated in FIG. 8 is cylindrical and has a plurality of spaced rows of perforations along its height.

The stilling well is preferably attached to the bottom of the container and includes a removable pin 40 at its lower end 42 that secures the lower end of the chain within the stilling well.

Although the chain 12 shown in FIG. 1 extends from the top to the bottom of the container, it may, as shown in FIG. 9, only extend from about the high level position to the low level position of the liquid, which are respectively below the top and above the bottom of the container. In such an embodiment, wires 12a and 12b or other connecting means can be used to connect the chain above the high level position and below the low level position, to the top and bottom, respectively, of the container.

It should be noted that one of the advantages of the method and system disclosed herein is that there is no limit to the depth of the container in which the method or system may be used.

While various embodiments of this invention have been shown and described, it would be apparent to those skilled in the art that many more modifications are possible without departing from the inventive concept herein. For example, although the system disclosed herein is illustrated in use with a container, it should be obvious to one skilled in the art that it may similarly be used in tanks, aqueducts, rivers, streams, etc. where an indication of the level of a liquid is desired. It is, therefore, to be understood that within the scope of the appended claims, this invention may be practiced otherwise than as specifically described.

What is claimed is:

1. A liquid level indicating system for indicating the level of a liquid in a container over a range of levels of the liquid, from a high level position of the liquid to a low level position of the liquid, the system comprising:

a plastic link chain suspended in the container extending at least between the high level position of the liquid and the low level position of the liquid with a substantially uniform density;

a weighing device positioned above the high level position of the liquid for measuring the weight of the chain; and means for securing a lower portion of the chain to the bottom of the container;

wherein the chain has sufficient slack so as not to affect the operation of the weighing device.

2. The liquid level indicating system according to claim 1 wherein the chain has a density characterized in that the ratio of the density of the liquid to the density of the chain is at least about 1:1 such that substantially only the weight of the portion of the chain above the level of the liquid is provided to the weighing device.

3. The liquid level indicating system according to claim 2 wherein the chain is polyvinyl chloride plastic.

4. The liquid level indicating system according to claim 1 further comprising a calibrator for the weight of the chain sensed by the weighing device.

5. The liquid level indicating system according to claim 4 wherein the calibrator is based on the specific gravity of the liquid.

6. The liquid level indicating system according to claim 1 further comprising a computer means receiving the output of the weighing device and computing the level of the liquid in the container from the weight of the portion of the chain above the level of the liquid.

7. The liquid level indicating system according to claim 1 wherein the weighing device comprises a load cell.

8. The liquid level indicating system according to claim 1 wherein the chain is sufficiently long such that when the container is empty, a lower portion of the chain is immediately adjacent a bottom of the container.

9. The liquid level indicating system according to claim 1 further comprising a stilling well into which the chain extends.

10. The liquid level indicating system according to claim 9 wherein the stilling well comprises a tube having a plurality of perforations along the tube.

11. A liquid level indicating system for indicating the level of a liquid in a container over a range of levels of the liquid, from a high level position of the liquid to a low level position of the liquid, the system comprising:

a weighing device positioned above the high level position of the liquid;

a plastic link chain suspended from the weighing device and extending in the container from at least the high level position of the liquid to the low level position of the liquid, the chain providing a substantially linear change in weight sensed by the weighing device with changes in the level of the liquid between the high and low level positions of the liquid and means for securing a lower portion of the chain to the bottom of the container;

wherein the chain has sufficient slack so as not to affect the operation of the weighing device.

12. The liquid level indicating system according to claim 11 wherein the ratio of the density of the liquid to the density of the chain is at least about 1:1.

13. The liquid level indicating system according to claim 11 further comprising means for calibrating the system.

14. The liquid level indicating system according to claim 13 wherein the calibration means is based on the specific gravity of the liquid.

15. The liquid level indicating system according to claim 11 wherein the chain is sufficiently long such that when the container is empty, a lower portion of the chain is immediately adjacent a bottom of the container.

16. The liquid level indicating system according to claim 11 wherein the chain is polyvinyl chloride plastic.

17. A liquid level indicating system for indicating the level of a liquid in a container over a range of levels of the liquid, from a high level position of the liquid to a low level position of the liquid, the system comprising:

a weighing device positioned above the high level position of the liquid;

a plastic link chain suspended from the weighing device to the liquid, the chain coupled at an upper portion to the weighing device and retained at a lower portion from upward movement relative to a bottom of the container; and means for securing a lower portion of the chain to the bottom of the container;

wherein the chain has sufficient slack so as not to affect the operation of the weighing device.

18. The liquid level indicating system according to claim 17, wherein the chain comprises a substantially uniform density between about the upper and lower level positions of the liquid.

19. The liquid level indicating system according to claim 18 wherein the ratio of the density of the liquid to the density of the chain is at least about 1:1 such that the weighing device is arranged to measure substantially only the weight of the portion of the chain above the level of the liquid.

20. The liquid level indicating system according to claim 19 further comprising a stilling well into which the chain extends.

21. The liquid level indicating system according to claim 20 wherein the stilling well comprises a tube having a plurality of perforations in the tube.

22. The liquid level indicating system according to claim 19 further comprising means for calibrating the system based on the specific gravity of the liquid.

23. The liquid level indicating system according to claim 22 wherein the chain is polyvinyl chloride plastic.

24. A method for measuring the level of a liquid in a container over a range of levels of the liquid, from a high level position of the liquid to a low level position of the liquid, the method comprising the steps of:

suspending a plastic link chain of substantially uniform density between the high level position and the low level position of the liquid;

securing a lower portion of the chain to the bottom of the container with sufficient slack so as not to affect operation of the weighting device; and weighing the chain to determine the level of liquid in the container.

25. The method according to claim 24 wherein the step of suspending comprises providing a chain having a density characterized in that the ratio of the density of the liquid to the density of the chain is at least 1:1 such that substantially only the portion of the chain above the level of the liquid is weighed.

26. The method according to claim 25 wherein the step of weighing comprises the step of calibrating the weight measured based on the specific gravity of the liquid.

27. The method according to claim 26 further comprising the step using a computer for receiving a signal corresponding to the weight of the chain.

28. The method according to claim 27 further comprising correlating the weight of the chain to the level of liquid in the container.

* * * * *